(12) United States Patent
Savarit et al.

(10) Patent No.: US 10,972,000 B2
(45) Date of Patent: Apr. 6, 2021

(54) SUPPLY SYSTEM TO A SET OF LOADS CONNECTED IN PARALLEL TO A DIRECT CURRENT SUPPLY BUS

(71) Applicant: GE Energy Power Conversion Technology Limited, Rugby (GB)

(72) Inventors: Elise Savarit, Massy (FR); Piniwan Thiwanka Bandara Wijekoon, Garching b. Munchen (DE); Nicolas Lapassat, Villebon sur Yvette (FR); Jean-Louis Pouliquen, Villebon sur Yvette (FR); Nicolas Gruau, Massy (FR)

(73) Assignee: GE Energy Power Conversion Technology, Ltd., Warwickshire (GB)

( * ) Notice: Subject to any disclaimer, the term of this patent is extended or adjusted under 35 U.S.C. 154(b) by 146 days.

(21) Appl. No.: 15/762,566

(22) PCT Filed: Sep. 26, 2016

(86) PCT No.: PCT/GB2016/052983
§ 371 (c)(1),
(2) Date: Mar. 23, 2018

(87) PCT Pub. No.: WO2017/055817
PCT Pub. Date: Apr. 6, 2017

(65) Prior Publication Data
US 2018/0278155 A1    Sep. 27, 2018

(30) Foreign Application Priority Data
Sep. 28, 2015    (EP) .................................... 15306514

(51) Int. Cl.
*H02M 1/44* (2007.01)
*H02H 7/26* (2006.01)
(Continued)

(52) U.S. Cl.
CPC ................ *H02M 1/44* (2013.01); *H02H 7/22* (2013.01); *H02H 7/268* (2013.01); *H02J 3/36* (2013.01);
(Continued)

(58) Field of Classification Search
CPC ...................................................... H02M 1/44
See application file for complete search history.

(56) References Cited

U.S. PATENT DOCUMENTS

| 9,627,862 B2 | 4/2017 | Hytten et al. | |
| 2002/0043968 A1* | 4/2002 | Cheng | H02M 1/15 |
| | | | 323/286 |

(Continued)

FOREIGN PATENT DOCUMENTS

| EP | 2 413 485 A1 | 2/2012 | |
| FR | 2012-B36805 | * 2/2012 | ............ H02M 5/458 |

(Continued)

OTHER PUBLICATIONS

Extended European Search Report and Opinion issued in connection with corresponding EP Application No. 15306514.9 dated Mar. 21, 2016.

(Continued)

*Primary Examiner* — Daniel Kessie
(74) *Attorney, Agent, or Firm* — Wood IP LLC

(57) ABSTRACT

The invention relates to a supply system for a plurality of loads connected in parallel to a direct current supply bus. The supply system includes a DC supply bus and a plurality of supply lines connected in parallel to the supply bus and supplying the said loads. The supply system includes uncoupling and damping means that is adapted to decrease the unipolar signals travelling within the supply system while the loads are being supplied. The uncoupling and damping means includes at least one inductance arranged in series in (Continued)

at least one of the supply lines. Protective means (are also provided for protection in the event of a fault.

9 Claims, 6 Drawing Sheets

(51) Int. Cl.
    *H02J 3/36*     (2006.01)
    *H02H 7/22*     (2006.01)
    *H02M 7/44*     (2006.01)

(52) U.S. Cl.
    CPC ......... *H02M 7/44* (2013.01); *H02J 2003/365* (2013.01); *Y02E 60/60* (2013.01)

(56) References Cited

U.S. PATENT DOCUMENTS

| | | | | |
|---|---|---|---|---|
| 2011/0148209 A1* | 6/2011 | Williams | ............ | H02J 3/32 307/75 |
| 2013/0088080 A1* | 4/2013 | Smith | ............ | H02M 1/126 307/43 |
| 2013/0264878 A1* | 10/2013 | Swearingen | ............ | H02J 9/062 307/65 |
| 2013/0285582 A1* | 10/2013 | Ohashi | ............ | H02M 3/1582 318/377 |
| 2016/0164448 A1* | 6/2016 | Kane | ............ | H02M 1/44 318/400.24 |
| 2017/0306928 A1* | 10/2017 | Tahata | ............ | H02P 9/00 |

FOREIGN PATENT DOCUMENTS

| | | |
|---|---|---|
| WO | 2013/127575 A1 | 9/2013 |
| WO | 2014/037583 A2 | 3/2014 |
| WO | 2014/189675 A2 | 11/2014 |

OTHER PUBLICATIONS

International Search Report and Written Opinion issued in connection with corresponding PCT Application No. PCT/GB2016/052983 dated Dec. 12, 2016.

Intention to Grant issued in connection with corresponding EP Application No. 15306514.9 dated Nov. 15, 2017.

* cited by examiner

SUPPLY SYSTEM TO A SET OF LOADS CONNECTED IN PARALLEL TO A DIRECT CURRENT SUPPLY BUS

The present invention concerns supply systems to electrical loads intended especially, but not exclusively, for underwater settings. More specifically, it relates to a system supplying loads supplied in parallel from a shared direct current (DC) supply bus. The nature of the loads supplied can vary, and may for instance consist of alternating current (AC) motors supplied by supply lines connected in parallel to the DC bus via a DC/AC converter. The DC/AC converter consists of an inverter that can for instance be made from commutation cells which can be guided by pulse width modulation (PWM).

BACKGROUND OF THE INVENTION

As one can conceive, particularly in the context of underwater settings, with such supply systems the length of supply line on the DC side, extending from the DC bus to the DC/AC converter, and the length of the supply line on the AC side, between the DC/AC converter and load, can be relatively important and can vary in a significant manner from one supply line to another.

In addition, load power can vary, as, for instance, in the case of electric motors.

For these reasons, overall supply line impedance, including load impedance, can vary in a significant manner.

Electrical loads connected to parallel supply lines are likely to comprise powerful electronic components, which can generate unipolar signals that proliferate within the DC supply bus and towards other supply lines.

There could be converters dedicated to supplying loads capable of generating unipolar voltage within the system. Such voltage in turn creates unipolar currents which are subject to any impedance within the circuit. Unipolar signals can in particular proliferate within supply lines comprising different impedance models, and can generate excessive voltage and current levels which can be detrimental to the isolation systems provided within supply lines and loads.

In the relevant technical field, a range of supply systems is known that are capable, among other things, of protecting sections of a power supply circuit where a fault has developed. WO 2013/127575 and WO 2014/189675 describe electric power distribution systems using fuses to protect any electro-mechanical converters or switches serving electrically in order to isolate a defective section within an electric network.

In WO 2014/037583 voltage converters incorporate a galvanic isolation to uncouple converter input and output.

Furthermore, EP 2413485 discloses an electrical system supplying an AC load from an AC network, which comprises a booster fitted with controllable electronic switches to convert the AC supplied by the electrical network into direct current, and a control device for the electronic switches designed to limit the absolute voltage value between electric load and AC phase delivered to a load whilst this load is under excessive voltage.

In view of the above, the aim of the invention is to propose a supply system for a plurality of loads connected in parallel, which is capable of preventing any interference occurring within the supply line of one of the loads from travelling within it, and preventing such interference from reaching other loads.

BRIEF DESCRIPTION OF THE INVENTION

To this end, a power supply system for a plurality of loads is proposed, which comprises a DC supply bus and a plurality of supply lines connected in parallel to the supply bus and supplying the said loads. The supply system further comprises uncoupling and damping means capable of decreasing the unipolar signals travelling within the supply system while the loads are being supplied. The uncoupling and damping means includes at least one inductance arranged in series with at least one of the supply lines.

In one implementation option, the uncoupling and damping means further comprises at least one capacitor connected between earth (or ground) and the supply bus.

Depending on the configuration of the uncoupling and damping means, isolation constraints of sensitive components (such as motors for instance) are reduced by uncoupling supply lines and reducing and damping the unipolar currents travelling within the supply lines.

A resistance is connected in parallel to the at least one inductance.

A further feature of the invention is that the supply system additionally includes protective means in the event of a fault in a section of the supply system. Protective means can be provided in one or more of the supply lines.

According to one implementation option, the protective means includes a plurality of non-return diodes in each supply line in such a manner as to prevent the current from travelling towards the supply bus. If each supply line includes a DC/AC converter, each non-return diode can be connected in series between the respective at least one inductance and the respective DC/AC converter.

The protective means also includes a breaker in each supply line with electronic switch components controlled by a control system or other device on the basis of the value of the current travelling in the said supply system section. Each breaker can be connected in series between the respective at least one inductance and the supply bus.

An electro-mechanical switch can be activated in the event of a fault over the relevant section of the protective means. The protective means can include an electro-mechanical switch in each supply line, connected in series between the respective at least one inductance and the supply bus.

In addition, yet another feature of the supply system is that each supply line includes a DC/AC converter supplying the said loads, e.g., AC electrical loads.

Each inductance can include a first coil connected to a first DC line of the respective supply line (e.g., a positive DC line) and a second coil connected to a second DC line of the respective supply line (e.g., a negative DC line). Each inductance can include a third coil. The coils can be unipolar coils and can be wound on the same core. The resistance mentioned above can be connected in parallel with the third coil. Each inductance can be adapted to have a common mode as described in more detail below.

As used herein, the term "connection" does not necessarily imply a direct electrical connection between components, but includes electrical connections with one or more interposing components.

BRIEF DESCRIPTION OF THE DRAWINGS

The following description, which is provided purely as a non-exclusive example, highlights other aims, features, and advantages of the invention. It relates to the drawings where.

DETAILED DESCRIPTION OF THE INVENTION

Figure 1:
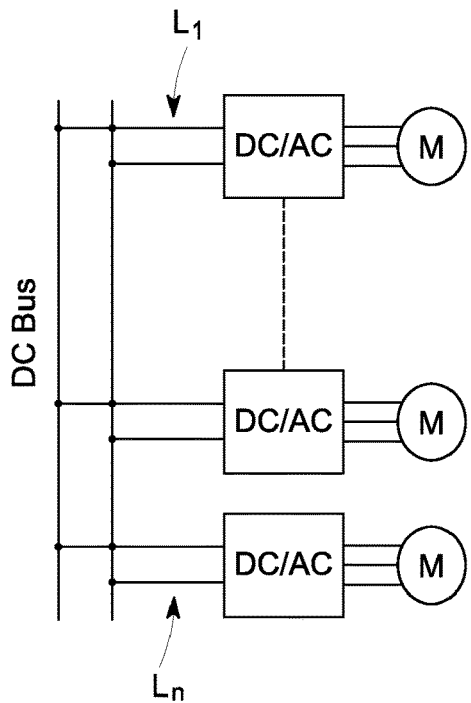
FIG. 1 is a schematic diagram of a supply system for a plurality of loads connected in parallel.

FIG. 1 shows an example of how to implement a supply system for a plurality of loads.

As can be seen, the supply system includes a DC supply bus (labelled DC BUS) to which a plurality of supply lines L1, . . . Ln are connected.

The DC supply bus in the implementation example is a medium voltage direct current (MVDC) supply bus.

Here, the supplied loads are AC motors M. It should be noted, however, that any other loads connected in parallel to a DC supply bus remain within the scope of the invention.

As can be seen, the motors M are supplied by supply lines via DC/AC converters.

As previously indicated, the loads and in particular the DC/AC converters are likely to create voltage or unipolar currents that could generate high voltage potentially detrimental to supply line, converter, and motor isolation means.

Figure 2:
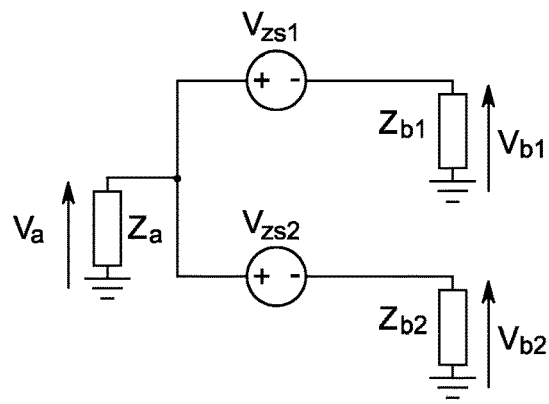
FIGS. 2 and 3 are equivalent unipolar diagrams of a supply system comprising two supply lines in parallel.

FIG. 2 represents the equivalent unipolar diagram of a supply system which, for the purposes of simplicity, only has two supply lines supplied by one shared DC supply bus.

Figure 3:
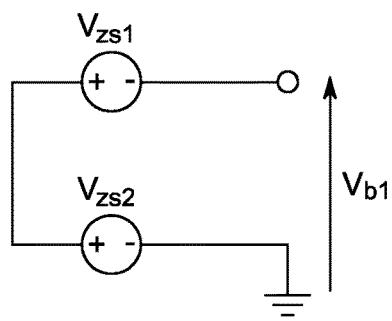

On this diagram, $Z_{b1}$ and $Z_{b2}$ represent the respective equivalent impedances of the system (converter, load including AC supply line sections and motor impedance) and $Z_a$ represents the equivalent impedance between the supply bus and earth on the DC side. $V_{zs1}$ and $V_{zs2}$ represent the unipolar voltages generated by the two power supply line converters, and $V_{b1}$ and $V_{b2}$ represent the voltage at the $Z_{b1}$ and $Z_{b2}$ impedance terminals. As can be readily understood, the equivalent circuit is highly dependent on the value of its parameters. For example, if $Z_{b2}$ is negligible compared with $Z_a$ and $Z_{b1}$, the equivalent circuit becomes that of FIG. 3.

This leads to:

$$V_{b1}=V_{zs2}-V_{zs1} \quad \text{(Eq1)}$$

Thus, the voltage at the point of motor isolation can equate to the sum of the $V_{zs1}$ and $V_{zs2}$ unipolar voltages.

Figure 4:
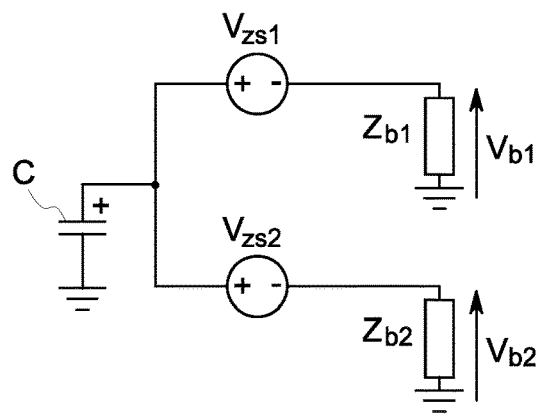
FIG. 4 is a schematic diagram of a first implementation of an uncoupling and damping means that is not in accordance with the invention.

As illustrated in FIG. 4, a first implementation to alleviate this problem is to connect the DC supply bus to earth via a capacitor C. The capacitor C is selected so that its value exceeds $Z_{b1}$ and $Z_{b2}$ in order to minimize interactions between supply lines, and prevent the unipolar signals from adding themselves together in the supply bus.

Figure 5:
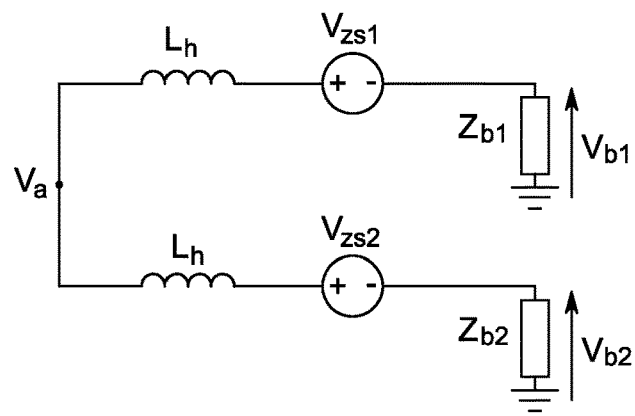
FIG. 5 is a schematic diagram of a second implementation of the uncoupling and damping means that is in accordance with the invention.

As illustrated in FIG. 5, a second implementation is to connect an inductance Lh in series with the converters on each of the supply lines on the DC side. As can be readily understood, this inductance absorbs the majority of the AC unipolar voltage component. However, the potential interactions between supply lines are maintained.

Figure 6:
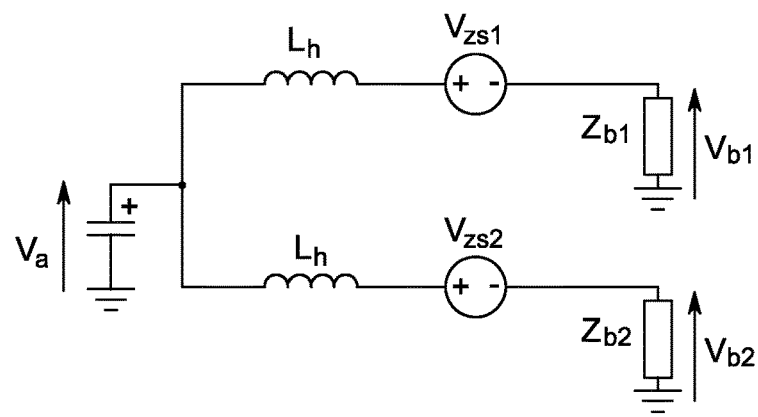
FIG. 6 is a schematic diagram of a third implementation of the uncoupling and damping means that is in accordance with the invention.

Thus, as shown in FIG. 6, to prevent interactions between supply lines whilst decreasing unipolar signals, the supply system should have uncoupling and damping means in each supply line. This should include several inductances Lh in common mode and one or more capacitors C connecting the DC supply bus to earth (or ground). Such an arrangement would reduce the voltage in the loads generated by unipolar signals. This implementation has been found to be particularly suitable for underwater settings.

Figure 7A:
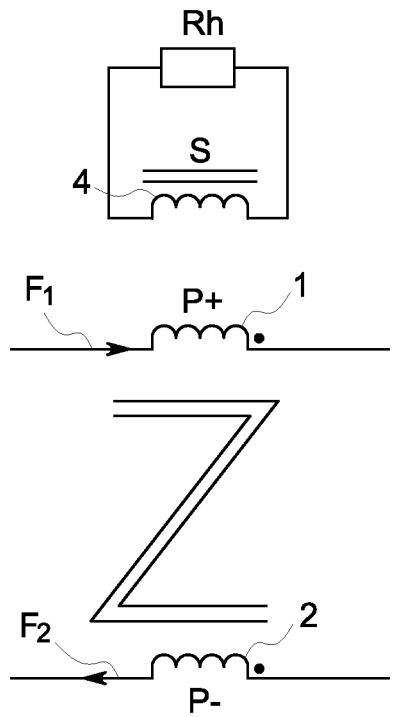
FIGS. 7A and 7B illustrate the operation of the filtering inductance in a differential mode.
Figure 7B:
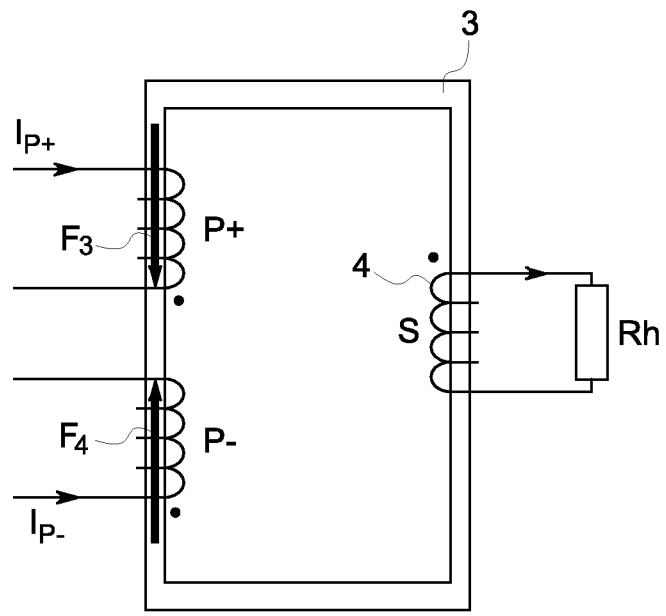
Figure 7C:
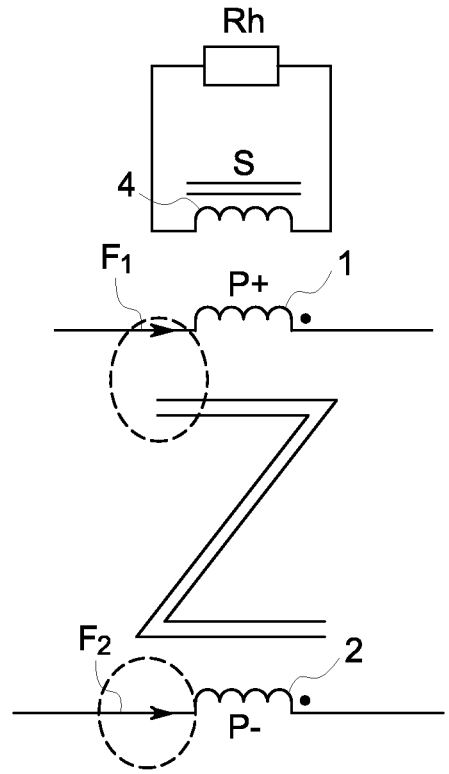
FIGS. 7C and 7D illustrate the operation of the filtering inductance in a common mode.
Figure 7D:
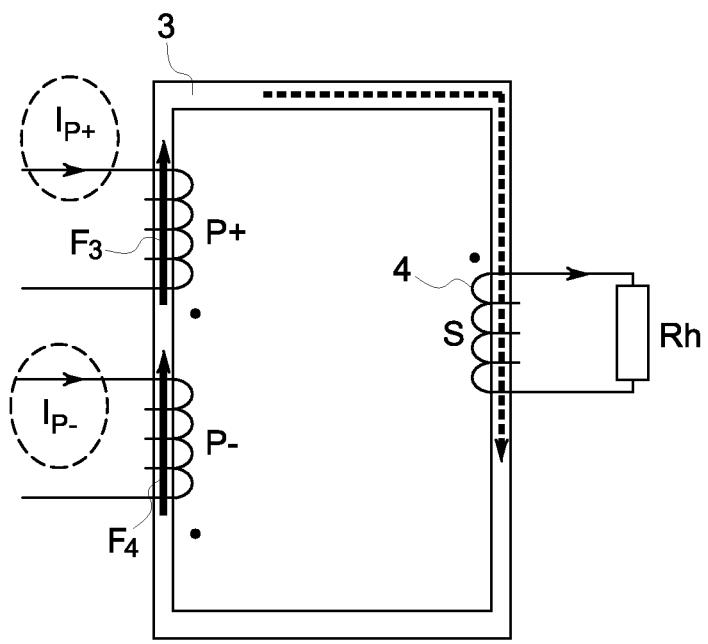

FIGS. 7A, 7B, 7C, and 7D show the electric circuit and structure of a filtering inductance for filtering the noise generated by the unipolar signals within a differential mode (FIGS. 7A and 7B) and a common (or zero sequence) mode (FIGS. 7C and 7D).

The inductance is provided by two wound coils 1 and 2 arranged around a core 3.

As illustrated by the arrows F1 and F2, which illustrate the currents $I_{p+}$ and $I_{p-}$ within the inductance coils, the $I_{p+}$ and $I_{p-}$ currents of both coils are travelling in the same direction in the common mode, whereas they are travelling in opposite directions in the differential mode. In the differential mode, the magnetic flux generated by the coils 1 and 2 is in opposite directions and cancels each other out (see arrows F3 and F4). In the common mode, the magnetic flux generated by the coils 1 and 2 is in the same direction and is added together, resulting in high impedance. It is possible, but not essential, to add a damping resistance in parallel with one of the unipolar inductance coils 1 or 2, or in parallel to coil 1 and to coil 2. As shown, there is also the option to add a damping resistance Rh in parallel to a third unipolar inductance coil 4.

Figure 8:
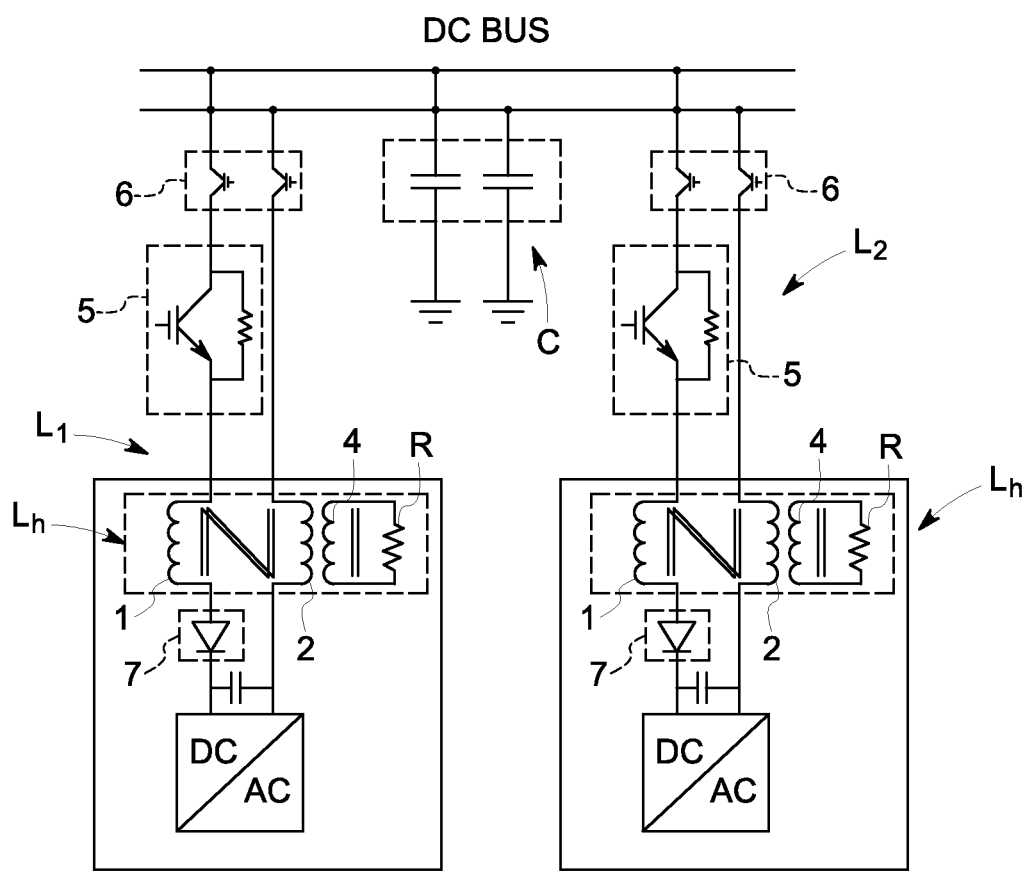
FIG. 8 is a schematic diagram of a detailed supply system in accordance with the invention.

FIG. 8 represents a detailed supply system implementation according to the invention.

FIG. 8 shows the shared DC supply bus (labelled DC BUS) and supply lines L1 and L2—limited to two here for clarity purposes. FIG. 8 also shows an uncoupling and damping means (or circuit) in a common mode comprising two capacitors C connected between the supply bus and earth (or ground) and two inductances Lh. One capacitor is connected to a first DC line (e.g., a positive line) of the supply bus and the other capacitor is connected to a second DC line (e.g., a negative line) of the supply bus. Each inductance includes primary coils 1 and 2, a secondary coil 4, and a resistance R connected in parallel with the secondary coil 4. The first primary coil 1 is in a first DC line (e.g., a positive line) and the second primary coil 2 is in a second DC line (e.g., a negative line).

Protective means are incorporated in the supply system to prevent a fault such as a short-circuit occurring in one of the supply line loads from reaching the shared supply bus.

Such protective means includes, for each supply line L1 and L2, a breaker 5 with electronic power components, IGBT (Insulated Gate Bipolar Transistor) in this instance, controlled via a control circuit (not shown), based on the level of current travelling within the supply line as measured by an appropriate sensor (not shown).

As soon as the level of current exceeds a predetermined threshold, the control circuit directs the electronic power components of the breaker 5 to open.

As can be readily understood, such a layered protection is particularly effective in that it can intervene very swiftly to isolate a defective circuit section. It may, however, prove insufficiently reliable in as much as it could develop a fault itself. To enhance protective resilience, the protective means further includes an isolation means comprising an electro-mechanical or electro-magnetic switch 6 for each supply line, such as, for instance, a conveniently motorized breaker, which may require longer to open, but which offers improved isolation inasmuch as the circuit is opened by mechanical means.

FIG. 8 also shows that the protective means are supplemented by a non-return diode 7 preventing the current coming from a DC/AC converter or, more generally, any defective load, from travelling towards the shared supply bus.

The operation of the detailed supply system implementation of FIG. 8 when faced with a fault on a supply line will now be described.

Figure 9:
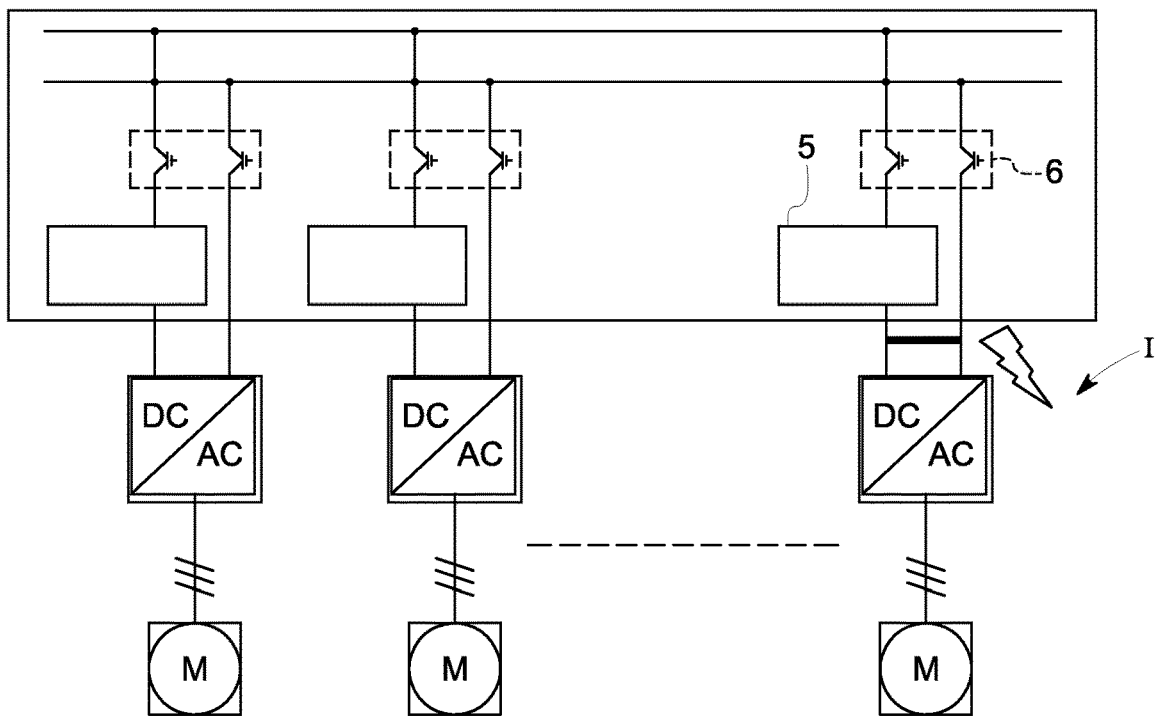
FIGS. 9 and 10 are schematic diagrams illustrating how the protective means of a supply system operate in accordance with the invention.
Figure 10:
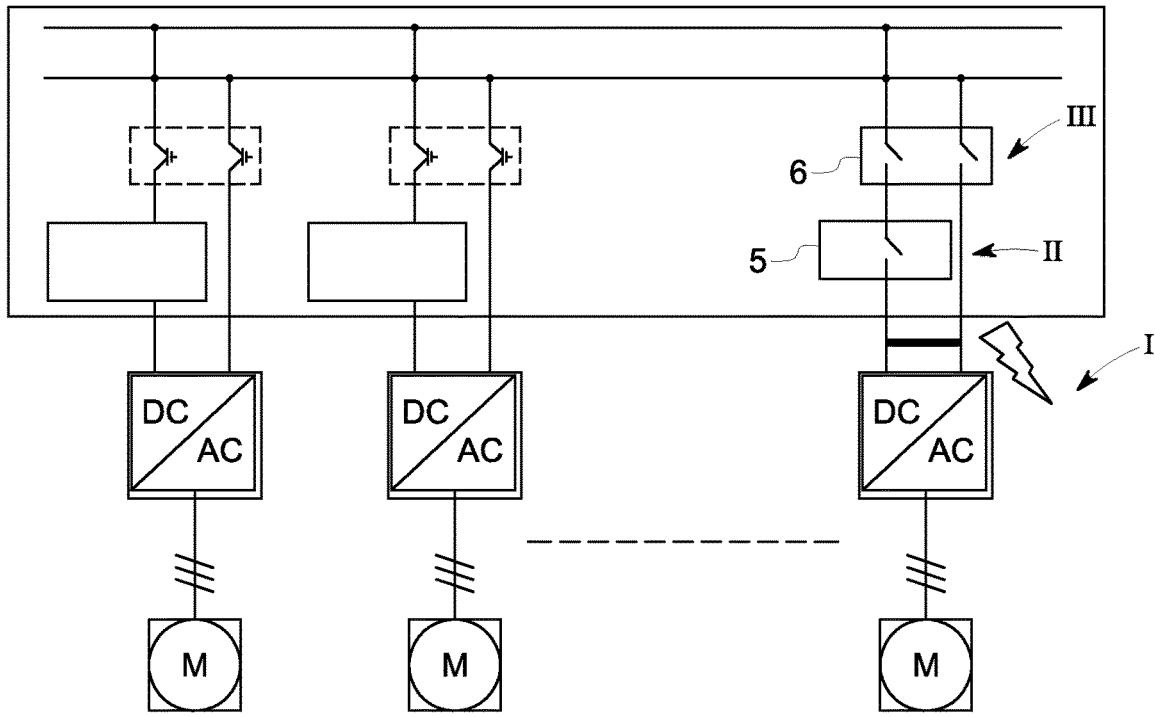

Referring to FIG. 9, when a short-circuit occurs on a supply line between the protective means (e.g., the breaker 5) and the DC/AC converter, in stage I the DC/AC converter is stopped by the opening of its own electronic power components (e.g., its IGBTs).

In stage II, the breaker 5 swiftly opens, in order to isolate the faulty circuit branch and prevent the short-circuited current from travelling towards the DC supply bus, and hence to the other loads. The non-return diodes 7 prevent the current arising from the faulty supply line converter from travelling towards the DC supply bus, and prevent the capacitors and other DC/AC converters from discharging into the faulty supply line.

In stage III, the electro-mechanical switch 6 opens in order to isolate the faulty circuit branch mechanically, and to safely enable the maintenance of operations to proceed on that supply line.

The invention claimed is:

1. A supply system for a plurality of loads comprising:
   a direct current (DC) supply bus comprising a positive DC line and a negative DC line;
   a plurality of supply lines connected in parallel to the positive and negative DC lines of the DC supply bus and each supply line comprising a DC/AC converter being connected at an AC side to a load of the plurality of loads for supplying the loads; and
   an uncoupling and damping means disposed in each supply line and configured to absorb AC unipolar signals travelling within a respective supply line of a load of the plurality of loads while the loads are being supplied, the uncoupling and damping means in a common mode comprising a first capacitor and a second capacitor both connected directly at one end to ground and opposite ends thereof to the positive DC line and the negative DC line, respectively, and at least one inductance connected in series to a DC side of the DC/AC converter on each supply line and each inductance comprising a first unipolar inductance coil in the positive DC line and a second unipolar inductance coil in the negative DC line;
   protective means that intervene in the event of a fault in one section of the supply system and wherein the protective means includes a non-return diode in each supply line in such a manner as to prevent current from travelling towards the supply bus; and wherein each non-return diode is connected in series between the respective at least one inductance and the respective DC/AC converter.

2. A supply system in accordance with claim 1, comprising a resistance connected in parallel to the inductance.

3. A supply system in accordance with claim 1, wherein the protective means includes a non-return diode in each supply line in such a manner as to prevent current from travelling towards the DC supply bus.

4. A supply system in accordance with claim 1, wherein the protective means includes a breaker in each supply line with electronic switching components controlled by a control system based on the value of the current travelling within the said supply system section.

5. A supply system in accordance with claim 4, wherein each breaker is connected in series between the respective at least one inductance and the DC supply bus.

6. A supply system in accordance with claim 1, wherein the protective means includes an electro-mechanical switch in each supply line activated in the event of a fault within the said supply system section.

7. A supply system in accordance with claim 6, wherein each electro-mechanical switch is connected in series between the respective at least one inductance and the DC supply bus.

8. A supply system in accordance with claim 1, wherein each inductance further includes a third unipolar inductance coil.

9. A supply system in accordance with claim 8, wherein the resistance is connected in parallel with one of the first coil, the second coil, the first coil and the second coil, and the third coil.

\* \* \* \* \*